March 29, 1966 M. H. SCHWAB ET AL 3,243,204

FORM BLANK SYSTEM AND ASSEMBLY

Filed July 2, 1965 2 Sheets-Sheet 1

INVENTORS
MARVIN H. SCHWAB &
SIDNEY C. BARNES
BY Gregory S. Dolgorukov
ATTORNEY

FORM BLANK SYSTEM AND ASSEMBLY

Filed July 2, 1965 2 Sheets-Sheet 2

INVENTORS
MARVIN H. SCHWAB &
SIDNEY C. BARNES
BY Gregory S. Dolgorukov
ATTORNEY

United States Patent Office 3,243,204
Patented Mar. 29, 1966

3,243,204

FORM BLANK SYSTEM AND ASSEMBLY

Marvin H. Schwab, Detroit, and Sidney C. Barnes, Bloomfield Hills, Mich., assignors, by mesne assignments, to M.C.U.L. Corporation, Detroit, Mich., a corporation of Michigan Filed July 2, 1965, Ser. No. 473,891
3 Claims. (Cl. 282—23)

This application is a continuation-in-part of our co-pending application Serial No. 329,113, filed on December 9, 1963, for Form Blank System and Assembly, now abandoned.

This invention relates to an improved system of producing legal documents and more particularly to an assembly or combination of certain documents in a partially prepared form, whereby completion of such documents may be effected in a single operation.

It has now been well established that having such documents partially prepared by way of printed forms or "legal form blanks" providing thereon in print only the matter common to virtually all such documents, such as the title of the document, the preamble, standard provisions, and blank spaces for special subject-matter to be filled in therein, such as the names and addresses of the parties to a contract, and special provisions has important advantages, and such forms have been widely used not only by laymen using them as a guide but also in many law offices. Production of such legal forms has now developed into a substantial industry.

We have found, however, that the above improvement, while exceedingly useful and important, is, in effect, only the first step or steps of rationalizing office methods, and leaves unsolved many important problems involved therein. This is particularly apparent when a legal transaction includes preparation of several documents forming parts of the same transaction, and therefore having a certain common subject-matter appearing in all of the documents as well as individual subject-matter appearing only in one or some of the documents. Having substantial differences, such documents are prepared separately. When printed legal forms are used in the preparation of such separate documents, a common difficulty results from the necessity of selecting proper forms involved in the transaction. Such selection requires examination of the respective forms and making a proper selection both of individual forms and of the entire combination. The process of such selection requires high skill and, in many instances, participation of a supervising lawyer, increasing costs and creating possibilities of mistakes.

Filling out such forms requires close attention to the content of each form, which again presents another source of possible mistakes. In addition, the separate typing of such forms presents the possibility of typographical errors, some of which, such as variance in spelling of the names of the parties involved, may invalidate some of such documents or the entire transaction.

As a result, processing certain legal transactions in various offices and particularly in financial institutions requires very close supervision, participation of supervising lawyers in routine office operations, slows down the work and greatly increases the time necessary for completion of paper work involved in certain financial transactions. Such a condition, in turn, makes processing of certain financial transactions so expensive as to require making of a certain service charge therefor. In cases of transactions where making such service charges is not practicable, participation of smaller financial institutions such as co-operative banking organizations and loan associations in such transactions may become very difficult.

In fact, we have found that the routine paper work required in making a loan by an institution of the latter type is entirely too expensive and time consuming. This results in part from the fact that an institution of this general nature has virtually no source of equity capital except that provided by its members and, therefore, unless an improved method of document production involved in loan transactions is devised, it would continue to be extremely difficult, if not prohibitive, for such institutions working within the limitations of the above explained conditions to render loan services which would be of great value and benefit to the public.

One of the objects of the present invention is to provide an improved assembly or set of partially prepared documents or legal form blanks so composed and arranged in such space relation and physical connection as to have the above problems overcome and largely eliminated without introducing other problems and with attaining substantial savings in costs.

Another object of the present invention is to provide a plurality of legal form blanks involved in a transaction such as a loan, with each blank forming a part of such assembly having its printed subject-matter so arranged thereon, and the individual blanks of the assembly connected together in such space relation to each other, and having interposed therein carbon paper with both effective and ineffective portions in such space relation to the documents that in spite of typing being done on the top surface of the assembly, only the common subject-matter required on each document appears thereon in proper places, while the matter which need not appear on the form which is the top sheet of the assembly, or on any subjacent forms, does not appear thereon in spite of being typed on such sub-top surface without removing the ribbon from the typewriter or in spite of the fact that the keys of the typewriter produce typing pressure through such documents.

A further object of the present invention is to provide an assembly of forms of the type referred to above in which the sizes of the separate forms are so selected and their physical connection is such that the upper document is placed in a position to receive through the typewriter ribbon only the typing which must appear thereon or on the one or on some of the subjacent documents, but no typed subject-matter which is to appear only on any of the subjacent documents appears on such upper document in spite of being typed through the ribbon.

Further objects and advantages of this invention will be apparent from the following description and appended claims, reference being had to the accompanying drawings forming a part of this specification, wherein like reference characters designate corresponding parts in the several views.

Figures 1, 3:
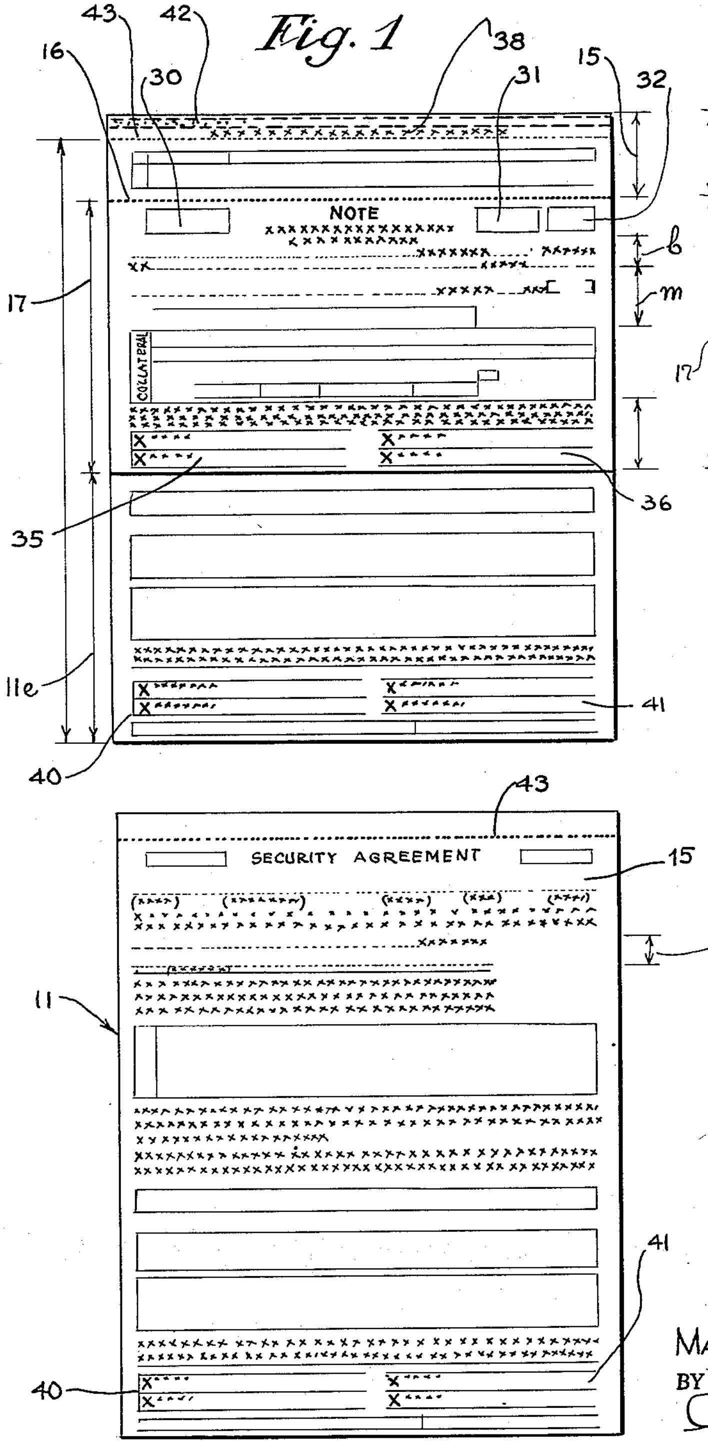
FIG. 1 is a front view of the assembly or set of the legal form blanks embodying the present invention.
FIG. 3 is a front view of one of the lower blanks shown separately.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

In the drawings there is shown by way of example an assembly of legal form blanks, with each form blank including printed matter and blank spaces to be filled in. The blanks comprised by the assembly are intended to be filled in and signed as a part of the same legal transaction. The present invention is illustrated and described herein with reference to an assembly including blanks of two types, and particularly the blanks of a promissory note and a security agreement, both of which have to be filled out and signed as a part of a loan transaction, such for instance as granting of a loan by a financial institution, a bank, a loan association, and the like, to a borrower or debtor such as a private person, where the loan has to be secured by a collateral. It will be understood, however, that the present invention is applicable to legal form blanks, a plurality of which has to be filled out and signed as a part of other legal transactions, with the blanks being of more than of two kinds, and with any of such blanks to be filled out with any practicable number of copies.

Referring specifically to the drawings there is shown therein, by way of example, an assembly of legal form blanks comprising a promissory note form blank generally designated by the numeral 10, a security agreement form blank 11, and a duplicate blank of the security agreement designated by the numeral 12. The blanks 11 and 12 of the security agreement are substantially identical. They are designated by different numerals for the purpose of convenience of describing the invention. The blanks of the note and of the security agreement have the same width. However, the blanks of the security agreement are substantially longer. Therefore, when all of the blanks are assembled to have their upper and side edges in registry, the security agreement blanks extend beyond the bottom edge of the promissory note blank 10 with portions of substantial area designated by the numeral **11*c* and 12*c***.

Figure 2:
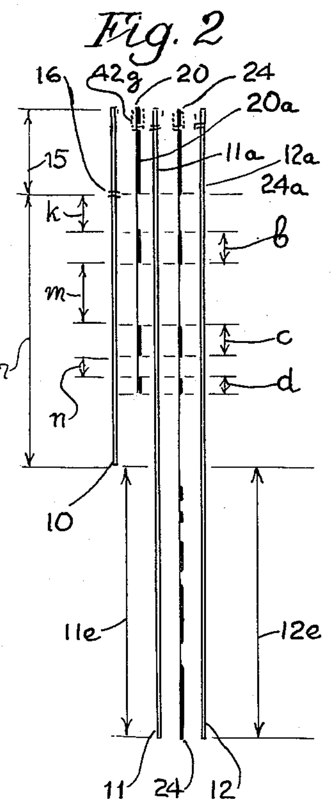
FIG. 2 is an exploded end view of the assembly or set of FIG. 1.
Figure 4:
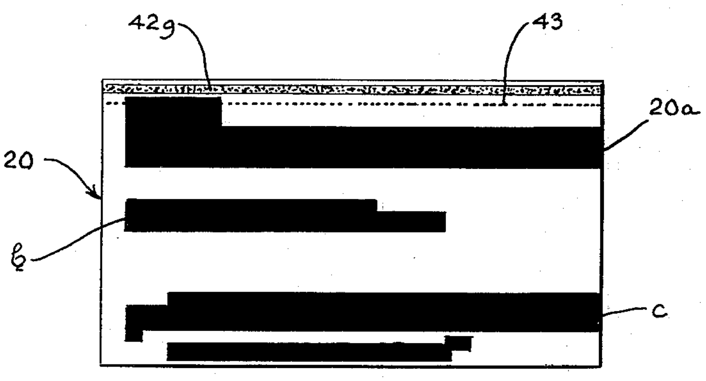
FIG. 4 is a front view of the first copy-producing medium, such as sheet of carbon paper showing arrangement of carbonized portions thereon.

It should be noted at this point that the promissory note blank 10 is formed with a disposable service portion 15 which can be separated from said blank because of the provision of a row of perforations 16. Thus the actual or usable part of the promissory note blank is represented by its portion 17. A sheet 20 of copy-producing medium, such as carbonized paper commonly referred to as "carbon paper," is interposed between the blanks 10 and 11, with said sheet having effective and ineffective portions, or carbonized and uncarbonized portions, as is shown in FIGS. 2 and 4. A duplicate blank 12 of the security agreement is provided underneath the blank 11, and a sheet 24 of copy-producing medium, such as carbon paper also with carbonized and uncarbonized portions, is interposed between the blanks 11 and 12.

The printed contents and the blank spaces of said blanks, and the effective or carbonized portions of said carbon sheet 20 are so composed and are arranged thereon in such space relations to each other that when the blanks 10 and 11 are connected together as explained above, the blank spaces of said blanks to be filled in with subject-matter common to both blanks 10 and 11, said spaces are in registry with each other and with the effective or carbonized portions of the carbon paper sheet 20. It should be noted at this point that the upper part of the carbon sheet 24 is identical in the arrangements of its carbonized portions with the sheet 20, as can be seen from examination of FIGS. 4 and 5. Since the duplicate blank 12 is substantially identical with the blank 11, the above relation holds true for both blanks 11 and 12.

When special matter is typed or written in the space 15 forming before separation a part of the upper blank 10, which blank comprises the note blank proper 17 and the disposable portion 15, such matter will appear also in spaces **11*a* and 12*a*** of the security agreement blanks. Thus, this matter remains common to all blanks only before separation.

The blank spaces which are intended to receive or to have filled in therein the subject-matter common to all three blanks 10, 11, and 12 in their finished form are exemplified in the present embodiment by the portions extending between the witness lines, the spread of which is designated by the characters *b*, *c*, and *d*. It will be noted that all such portions of all of the three blanks 10, 11, and 12 register with the effective or carbonized portions of the sheets 20 and 24, which carbonized portions are indicated in FIG. 2 by heavy lines. In the space *b* of the promissory note blank such common matter appears as identification of the creditor as the payee, while in the blanks 11 and 12 such identification of the creditor appears, because of the presence of adjacent printed matter therein, as the second party to the security agreement. A substantially similar condition exists with respect to space *c* of the blanks 10, 11 and 12 registering with each other and with the corresponding carbonized portions of the sheets 20 and 24. In these spaces appears identification of a motor vehicle or other property pledged as security for the loan and intended to appear both in the promissory note and the security agreement. Space *d* in the blanks 10, 11, and 12 registering with the corresponding carbonized portions of the carbon sheets 20 and 24 may be used for description of other property pledged or excepted as loan security property.

The subject-matter which is to appear only in the promissory note is received within the spaces *k*, *m*, and *n* thereof. These spaces are registering with ineffective or uncarbonized portions of the sheets 20 and 24, which portions are shown in thin line in FIG. 2, and therefore will not be reproduced in the blanks 11, and 12, in which blanks said spaces are utilized for printed matter desired in security agreements. The space *k* in the promissory note blank 10 is adapted to be filled in with the date of the note in the box 30, account number in the box 31, and the note number in the box 32. The space *m* is adapted to be filled in with matter identifying the place where payments on the note are to be made, the total amount of the loan, and description of the installments and their due dates. The space *n* may be used for other special statements which are to appear in the promissory note only. By virtue of the above construction, the matter in spaces *k*, *m*, and *n* of the promissory note blank will appear only in the promissory note but will not appear in the security agreement in spite of being typed or written in the agreement blanks 11 and 12 over the registering places in the security agreement.

The matter which appears only on the lower blank, i.e., only in the security agreement in the present embodiment, may be produced in accordance with the invention in two ways, i.e., by the provision of two expedients, which can be used as alternatives or together, as described below.

The first expedient is the provision of a discardable portion in the upper blank, which portion is filled out to have the same matter reproduced through the carbonized portion on the lower blanks, but with such portion to be separated and discarded after completion of the filling in operation. Such expedient is exemplified in the present embodiment by the discardable service portion 15 mentioned above. The second expedient is to arrange all such matter on the portion of the lower blank, i.e., on the portion not covered by the note blank 10, such as the downwardly extending portions 11*e* and 12*e* of the blanks 11 and 12. With such an arrangement, such subject-matter is typed or written directly in the spaces provided in the blank 11 and is reproduced in the blank 12 through the carbonized portion of the lower part of the sheet 24. It will be noted that although said lower part of the sheet 24 shows a number of separate carbonized areas, which is done in the present embodiment for the reasons of economy or reduction of cost, it may be a single or unbroken carbonized area.

It will be noted further that the places in the promissory note blank for signatures of makers and co-makers, designated by the numerals 35 and 36 in FIG. 1 do not have any effective carbonized portion underneath since the note is not to be executed in duplicate. Therefore, the sheet 20 terminates before reaching that portion of the blank 10. In addition, it is desired that the note blank 10 and the carbon sheet 20 be detached from the assembly before documents are signed. Accordingly an instruction to that effect may be provided in the discardable portion 15 as designated by the numeral 38. On the other hand, since the agreement is executed in duplicate, an effective carbon portion is provided underneath the boxes 40 and 41 of the upper security agreement blank 11, as shown in the drawings. It will also be noted that any additional provisions that may be desirable in the security agreements may be provided at the back thereof.

It will also be understood that should additional copies of any of the documents be desired, a carbon sheet and a blank therefor are provided immediately behind the basic blank. For instance, if additional copies of the agreement are desired, additional sub-sets including carbon sheets such as 24 and security agreement blanks such as 12 may be connected to the assembly at the back thereof.

All elements of the assembly described above are connected at the top in any suitable manner such as by a glue joint 42 which may be produced by gumming, i.e., providing a strip of glue on both sides of the sheets 20 and 24 as shown in FIG. 2 at 42*g*. Rows of perforations, which may be registering with each other as indicated at 43 in FIG. 1, are provided for separating the completed blanks from the glued stubs. These rows are provided in registry with one another in sheet 20, blank 11, sheet 24, and blank 12, but not in the blank 10, since row of perforations 16 is provided in said note blank 10 further down as illustrated in FIG. 1. If desired, a row of larger perforations, such as one-eighth of an inch in diameter and spaced at one-half inch intervals, may be provided between perforations 43 and the glued joint 42 for purposes of further advantages in mechanical handling of the blank assemblies.

The assemblies in their connected form thus present the appearance of separate sets of blanks connected together and having sheets of carbon paper in between. Sets of such nature may be packaged in any desired number and supplied to financial institutions. For use, a set of such blanks is inserted into a typewriter and the blank spaces are filled in, all at the same time. Thereupon the note and the first carbon are detached leaving the discardable portion 15 still connected to the remainder of the set. After the agreement and the note are signed, the agreement blanks are separated at their perforations and the carbon sheets together with the stubs of the blanks are discarded.

If in devising a blank system and assembly of the nature disclosed above it becomes necessary to have certain special matter appear only in the document which is the third from the top, but which should not appear in the top document or in the second from the top document, eliminating appearance of such matter in the top document is done by providing the discardable portion such as 15 thereon, while elimination of appearance of said matter in the second from the top copy may be done in two ways. The first way is to provide on the second from the top document a discardable portion similar to that provided in the top document. The second way is to have an ineffective portion in the carbon paper overlying that particular locality of the second from the top document. The second way is preferable where that particular portion of the second from the top document is necessary for providing printed subject matter thereon. The above described construction may be used in more than only one subjacent document, such as second from the top document, but also in third from the top and so on.

Figures 5, 7:
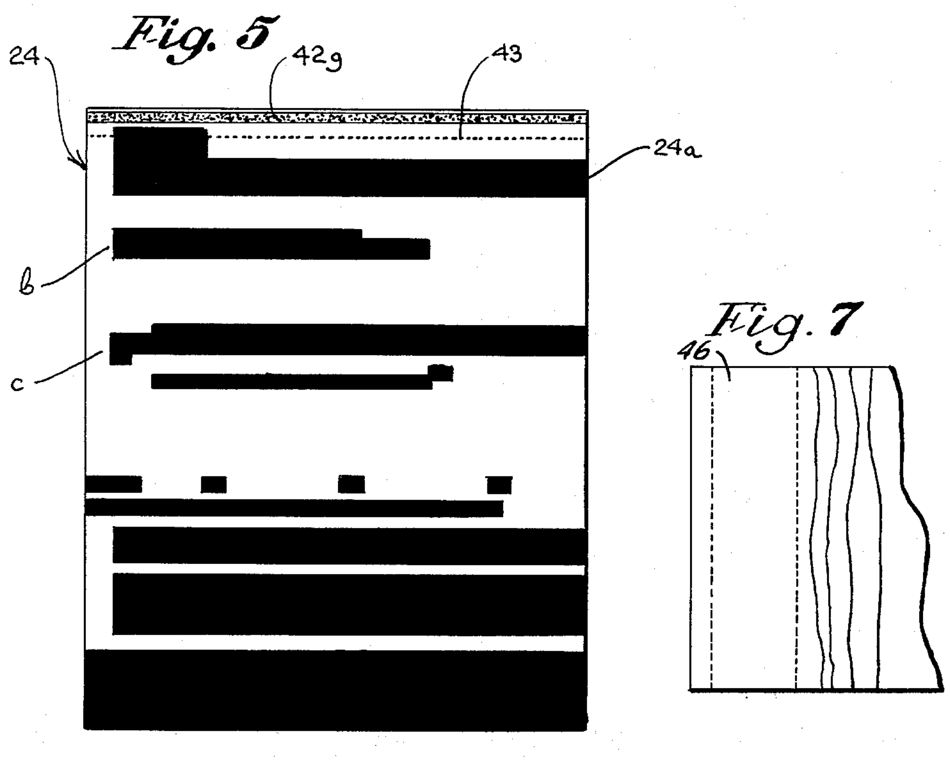
FIG. 5 is a front view of the second copy-producing sheet, also showing arrangements of carbonized portions thereon.
FIG. 7 is a view similar in part to FIG. 6 and showing a further modification.
Figure 6:
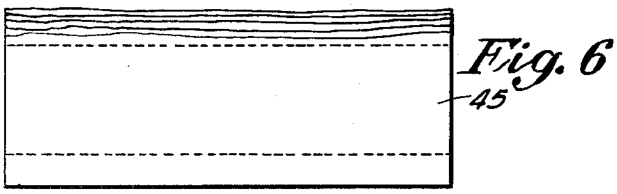
FIG. 6 is a fragmentary front view of an assembly or set of legal form blanks, showing a modified construction.

It should also be understood that should for some special reason the blanks are required to be connected at their lower or bottom edges rather than their top edges, then the lower edges have to be aligned and the discardable portion or portions such as one designated in FIG. 6 by the numeral 45 and substantially similar to the portion 15 of the construction of FIG. 1 may be provided at the bottom edge of the top document, or any subjacent document, in a manner similar to that disclosed above. The same holds true if alignment and connecting of the edges of the documents has to be at the side of the assembly, as shown in FIG. 7, wherein a similar portion is designated by the numeral 46.

By virtue of the above disclosed construction the objects of the present invention listed above, and numerous additional advantages are attained.

We claim:

1. A booklet type assembly of legal blanks secured together along their aligned upper edges to form a unitary structure for simultaneous typing production, with typing being done only on the top surface of the assembly, and including a top blank and a subjacent blank, having height larger than that of said top blank said blanks having areas with printed matter as well as blank spaces to be filled with special matter and thus to produce different documents having separate legal meaning, with some of the special matter required to appear on both the top blank as well as on the subjacent blank, and with other special matter required to appear on the top blank but not on the subjacent blank, and still other special matter required to appear on the subjacent blank in part near the bottom and in part near the upper edge thereof; said blank being composed and arranged to have the blank of smaller height extend horizontally over the blank of larger height to have portions of the subjacent blank near the upper and bottom edges thereof with blank spaces for special matter required to appear thereon but not on the top blank to be arranged therein in a position not to be covered by the smaller height top blank, a supporting blank portion associated with said top blank and forming an upward continuation thereof and extending from the upper edge of the top blank to the upper edge of the subjacent blank to have their edges aligned and secured together, said supporting portion having sufficient size to receive thereon the part of the special matter required to appear on the subjacent blank near the upper edge thereof and the printed matter calling for same, a line of separation provided on the subjacent blank immediately adjacent to the connected aligned edges of said blanks for separation of the subjacent blank but not of the top blank thereat, and a second line of separation provided between said top blank and said supporting portion to cause separation of said supporting portion as a discardable portion together with the special matter typed thereon and the printed matter calling for said special matter, and a sheet of carbon paper having effective and ineffective portions and provided between both the top blank with supporting portion and the subjacent blank, with said effective portions being in registry with the blank spaces for the special matter which has to appear on the top blank as well as the subjacent blank, and said ineffective portions being in registry with the blank spaces for the special matter which has to appear on the top blank but not on the subjacent blank, said supporting portion associated with the top blank extending downwardly to the bottom line of the lowermost blank space for the special subject-matter which has to appear in the upper portion of the subjacent blank but not on the top blank.

2. The booklet type assembly of legal blanks defined in claim 1, with the alignment and connection of the blank edges being at the lower edges thereof.

3. The booklet type assembly of legal blanks defined in claim 1, with the alignment and connection of the blank edges being at the side edges thereof.

References Cited by the Examiner

UNITED STATES PATENTS

| | | | |
|---|---|---|---|
| 2,406,267 | 8/1946 | Tambert | 282—22 |
| 2,576,164 | 11/1951 | Willis | 282—23 |
| 2,606,043 | 8/1952 | Lingle | 282—23 |
| 3,115,351 | 12/1963 | Dazey | 282—22 |

FOREIGN PATENTS

| | | |
|---|---|---|
| 553,606 | 6/1932 | Germany. |

EUGENE R. CAPOZIO, *Primary Examiner.*

LAWRENCE CHARLES, *Examiner.*